United States Patent
Lee et al.

(10) Patent No.: US 10,812,340 B2
(45) Date of Patent: *Oct. 20, 2020

(54) METHOD OF ESTABLISHING RELATIONSHIPS BETWEEN SETS OF LABEL SWITCHED PATHS AND VIRTUAL NETWORKS

(71) Applicant: FUTUREWEI TECHNOLOGIES, INC., Plano, TX (US)

(72) Inventors: Young Lee, Plano, TX (US); Dhruv Dhody, Bangalore (IN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,879

(22) Filed: Dec. 18, 2018

(65) Prior Publication Data

US 2019/0123971 A1 Apr. 25, 2019

Related U.S. Application Data

(63) Continuation of application No. 15/346,423, filed on Nov. 8, 2016, now Pat. No. 10,200,253.

(Continued)

(51) Int. Cl.
*G06F 15/16* (2006.01)
*H04L 12/24* (2006.01)
(Continued)

(52) U.S. Cl.
CPC .......... *H04L 41/12* (2013.01); *H04L 12/4633* (2013.01); *H04L 12/4641* (2013.01);
(Continued)

(58) Field of Classification Search
CPC ..................................................... H04L 45/50
See application file for complete search history.

(56) References Cited

U.S. PATENT DOCUMENTS 8,208,372 B2 * 6/2012 Vasseur ............... H04J 3/14
370/225
8,693,374 B1 4/2014 Murphy et al.
(Continued)

FOREIGN PATENT DOCUMENTS

CN 101883048 A 11/2010
CN 103916302 A 7/2014
(Continued)

OTHER PUBLICATIONS

X. Zhang, Ed et al. Applicability of a Stateful Path Computation Element {PCE}, draft-ietf-pce-stateful-pce-app-05, PCE Working Group.Oct. 19, 2015. total 25 pages.
(Continued)

*Primary Examiner* — Hieu T Hoang
(74) *Attorney, Agent, or Firm* — James Anderson Harrison

(57) ABSTRACT

A method for establishing end-to-end tunnels extending across multiple domains using a network element. The method includes receiving a request from a customer controller to implement a virtual network (VN) created by the customer controller, wherein the VN identifies the end-to-end tunnels extending across the multiple domains, mapping the VN to available resources based on network constraints in response to the request, and transmitting, after the VN has been mapped, a message to a network controller managing one of the domains that includes a network path used to form a portion of one of the end-to-end tunnels, wherein the message includes an association object having a Type-Length-Value (TLV) field containing a virtual network identifier binding the network path to the VN.

22 Claims, 11 Drawing Sheets

Related U.S. Application Data

(60) Provisional application No. 62/277,389, filed on Jan. 11, 2016.

(51) Int. Cl.
*H04L 12/46* (2006.01)
*H04L 12/715* (2013.01)
*H04L 12/723* (2013.01)

(52) U.S. Cl.
CPC .......... *H04L 41/5051* (2013.01); *H04L 45/04* (2013.01); *H04L 45/50* (2013.01); *H04L 41/5077* (2013.01)

(56) References Cited

U.S. PATENT DOCUMENTS

| | | | |
|---|---|---|---|
| 9,100,285 B1 | 8/2015 | Choudhury et al. | |
| 9,369,371 B2 | 6/2016 | Filsfils et al. | |
| 9,537,769 B2 | 1/2017 | Bryant et al. | |
| 2006/0268682 A1* | 11/2006 | Vasseur | H04L 41/12 370/216 |
| 2007/0133406 A1 | 6/2007 | Vasseur | |
| 2007/0183317 A1 | 8/2007 | Vasseur et al. | |
| 2008/0123521 A1* | 5/2008 | Vasseur | H04L 41/0663 370/217 |
| 2008/0219272 A1* | 9/2008 | Novello | H04L 45/04 370/401 |
| 2012/0054347 A1* | 3/2012 | Lee | H04L 45/64 709/226 |
| 2012/0076046 A1 | 3/2012 | Lin | |
| 2012/0224506 A1 | 9/2012 | Gredler et al. | |
| 2013/0336103 A1* | 12/2013 | Vasseur | H04L 41/12 370/216 |
| 2013/0336109 A1 | 12/2013 | Previdi et al. | |
| 2013/0336116 A1* | 12/2013 | Vasseur | H04L 45/125 370/235 |
| 2014/0036675 A1 | 2/2014 | Wang Xin et al. | |
| 2015/0029872 A1* | 1/2015 | Pignataro | H04L 43/10 370/252 |
| 2015/0098356 A1 | 4/2015 | Bhattacharya | |
| 2015/0103844 A1 | 4/2015 | Zhao et al. | |
| 2015/0163151 A1 | 6/2015 | Li | |

FOREIGN PATENT DOCUMENTS

| | | |
|---|---|---|
| CN | 103051565 B | 1/2018 |
| JP | 2008042670 A | 2/2008 |
| WO | 2015051839 A1 | 4/2015 |

OTHER PUBLICATIONS

S. Huang et al. An Experimental Analysis on OSPF-TE Convergence Time. SPIE Proceedings, vol. 7137, Network Architectures, Management, and Applications VI,Nov. 19, 2008, 11 pages.

Kompella, K., Ed., et al., "OSPF Extensions in Support of Generalized Multi-Protocol Label Switching (GMPLS),"RFC 4203, Oct. 2005, 11 pages.

Bates, T., et al., "BGP Route Reflection: An Alternative to Full Mesh Internal BGP(IBGP)," RFC 4456, Apr. 2006, 12 pages.

Farrel, A., et al.,"A Path Computation Element (PCE)-Based Architecture," RFC 4655, Aug. 2006, 40 pages.

J.L. Le Roux, Ed. Et al., "Requirements for Path Computation Element (PCE) Discovery", RFC4674. Oct. 2006. total 19 pages.

J.L. Le Roux, Ed. Et al. OSPF Protocol Extensions for Path Computation Element (PCE) Discovery, RFC5088, Jan. 2008. total 20 pages.

J.L. Le Roux, Ed.et al. IS-IS Protocol Extensions for Path Computation Element (PCE) Discovery, RFC5089, Jan. 2008. total 17 pages.

L. Berger et al. The OSPF Opaque LSA Option, rfc5250, Jul. 2008. total 17 pages.

T. Li et al. IS-IS Extensions for Traffic Engineering, rfc5305, Oct. 2008. total 17 pages.

JP Vasseur, Ed. Et al. Path Computation Element (PCE) Communication Protocol (PCEP), rfc5440. Mar. 2009. total 87 pages.

M. Bjorklund, Ed. Et al. Yang—A Data Modeling Language for the Network Configuration Protocol (NETCONF), rfc6020. Oct. 2010. total 173 pages.

Y. Lee et al. PCEP Extensions for Establishing Relationships Between Sets of LSPs and Virtual Networks.draft-leedhody-pce-vn-association-00. PCE Working Group. Jan. 8, 2016.total 11 pages.

D. Dhody et al. PCEP Extension for Distribution of Link-State and TE Information. draft-dhodylee-pce-pcep-ls-00, Sep. 21, 2015.

Y. Lee, Ed. Et al. Framework for GMPLS and Path Computation Element (PCE) Control of Wavelength Switched Optical Networks (WSONs), rfc6163, Apr. 2011. total 51 pages.

D. King, Ed. Et al. The Application of the Path Computation Element Architecture to the Determination of a Sequence of Domains in MPLS and GMPLS, rfc6805, Nov. 2012. total 33 pages.

A. Farrel et al. Unanswered Questions in the Path Computation Element Architecture, rfc7399, Oct. 2014. total 29 pages.

Y. Lee, Ed. et al. Path Computation Element Communication Protocol (PCEP) Requirements for Wavelength Switched Optical Network (WSON) Routing and Wavelength Assignment, rfc7449, Feb. 2015. total 12 page.

H. Gredler, Ed. Et al. North-Bound Distribution of Link-State and Traffic Engineering (TE) Information Using BGP, rfc7752, Mar. 2016. total 48 pages.

ITU-T G.680, Series G: Transmission Systems and Media,Digital Systems and Networks Transmission media and optical systems characteristics—Characteristics of optical systems, Physical transfer functions of optical network elements, Jul. 2007. total 68 pages.

U. Palle et al. Path Computation Element (PCE) Protocol Extensions for Stateful PCE usage for Point-to-Multipoint Traffic Engineering Label Switched Paths, draft-palle-pce-stateful-pce-p2mp-06, Apr. 23, 2015. total 24 pages.

D. Dhody et al. Hierarchical Stateful Path Computation Element (PCE). draft-dhodylee-pce-stateful-hpce-00, Feb. 16, 2016. total 18 pages.

A. Bierman et al. RESTCONF Protocol, draft-ietf-netconf-restconf-17, Sep. 28, 2016. total 131 pages.

E. Crabbe et al. PCEP Extensions for PCE-initiated LSP Setup in a Stateful PCE Model draft-ieff-pce-pce-initiated-lsp-07, Jul. 18, 2016. total 18 pages.

Xian Zhang et al. Path Computation Element (PCE) Protocol Extensions for Stateful PCE Usage in GMPLS-controlled Networks, draft-ieff-pce-pcep-stateful-pce-gmpls-04.Oct. 16, 2015. total 13 pages.

Young Lee et al. Requirements for Abstraction and Control of TE Networks, draft-ietf-teas-actn-requirements-01. Oct. 1, 2015. total 23 pages.

Java Message Service, Version 1.1 Apr. 12, 2002. total 140 pages.

Katz, D., et al., "Traffic Engineering (TE) Extensions to OSPF Version 2," RFC 3630, Sep. 2003, 14 pages.

* cited by examiner

THE VIRTUAL-NETWORK-TLV FORMATS

METHOD OF ESTABLISHING RELATIONSHIPS BETWEEN SETS OF LABEL SWITCHED PATHS AND VIRTUAL NETWORKS

CROSS-REFERENCE TO RELATED APPLICATIONS

This application is a continuation of U.S. patent application Ser. No. US15/346,423, filed on Nov. 08, 2016, which claims priority to U.S. Provisional Patent Application No. 62/277,389 filed Jan. 11, 2016 by Young Lee, et al., and entitled "Path Computation Element (PCE) Communication Protocol (PCEP) Extensions For Establishing Relationships Between Sets Of Label Switched Paths And Virtual Networks," both of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Path Computation Element (PCE) is a network component, application, or node capable of computing sophisticated paths through a network by applying computational constraints in real time. Traditionally, network routes are calculated and managed off-line as part of a network's traffic engineering. In such a scenario, when a new customer comes online, the customer's traffic requirements are evaluated and superimposed on the current network's topology. The PCE architecture is defined by the Internet Engineering Task Force (IETF) Request for Comments (RFC) 4655 document titled, "A Path Computation Element (PCE)-Based Architecture," published in August 2006, which is incorporated herein.

The PCE has a complete picture of flows and paths in the network at the precise moment derived from other Operational Support Software (OSS) programs. As such, the PCE is able to calculate in real time the optimal path through the network. The path is then used to automatically update router configurations and the traffic engineering database. The PCE receives and responds to path computation requests received from a Path Computation Client (PCC) using a Path Computation Element Communication Protocol (PCEP). The PCEP is defined by the IETF RFC 5440 document titled, "Path Computation Element (PCE) Communication Protocol (PCEP)," published in March 2009, which is incorporated herein.

SUMMARY

When a virtual network (VN) is created by a customer over multi-domain and multi-layer traffic engineering (TE) networks, establishing a relationship between the VN and a set of network paths, such as label switched paths (LSPs), is important in order to manage and orchestrate the service associated with the VN. The systems and methods disclosed herein establish a relationship between a VN and network LSPs. In other words, the VN is bound to one or more LSPs. When virtual networks (VNs) are bound to LSPs, customers are able to orchestrate the VN they create from a service perspective. In addition, operators are able to orchestrate LSPs associated with the VN of the customer seamlessly and efficiently over multi-domain networks from a network perspective. In one example, the PCEP is extended between a multi-domain service coordinator (MDSC) and a physical network controller (PNC) to facilitate the binding association in the PCEP architecture. In another example, the protocol proposed in the IETF document entitled, "RESTCONF Protocol," published Sep. 20, 2016, which is incorporated herein by reference as if reproduced in its entirety, is created to allow the binding association. In that regard, a data model consistent with the data modeling language proposed in the IETF RFC 6020 document entitled, "YANG—A Data Modeling Language for the Network Configuration Protocol (NETCONF)," published October 2010, which is incorporated herein by reference as if reproduced in its entirety, may be used. Such a data model may be referred to as a "Yang data model."

In an embodiment, the disclosure includes method of establishing end-to-end tunnels extending across multiple domains using a network element including receiving a request from a customer controller to implement a virtual network (VN) created by the customer controller, wherein the VN identifies the end-to-end tunnels extending across the multiple domains, mapping the VN to available resources based on network constraints in response to the request, and transmitting, after the VN has been mapped, a message to a network controller managing one of the domains that includes a network path used to form a portion of one of the end-to-end tunnels, wherein the message includes an association object having a Type-Length-Value (TLV) field containing a virtual network identifier binding the network path to the VN.

In an embodiment, the network element is a Multi Domain Service Coordinator (MDSC) and the network controller is a Provider Network Controller (PNC). In an embodiment, the network element is Parent Path Computational Element (P-PCE) and the network controller is a Child PCE. In an embodiment, the customer controller is a Customer Network Controller (CNC). In an embodiment, the association object is a Virtual Network Association Group (VNAG) object. In an embodiment, the network path is a label switched paths (LSPs). In an embodiment, the virtual network identifier is one of a VN name and a tunnel identification (ID). In an embodiment, the network constraints comprise at least one of quality of service (QoS) and bandwidth. In an embodiment, the message is a PCInitiate message that conforms to a Path Computational Element Protocol (PCEP). In an embodiment, the message is established using a data model. In an embodiment, one of the messages is transmitted to one of the network controllers for each of the network paths that may be used to form the end-to-end tunnels. In an embodiment, the method further comprises receiving, from each of the network controllers, a report message indicating a status of the network paths managed by the network controllers. In an embodiment, the method further comprises sending, to one or more of the network controllers, an update message after the message has been transmitted, wherein the update message indicates any changes made to the VN by the customer controller.

In an embodiment, the disclosure includes a method of establishing end-to-end tunnels extending across multiple domains implemented by a network controller managing a domain including receiving a message from a first network element that was instructed by a customer controller to implement a virtual network (VN) including the end-to-end tunnels, wherein the message includes an association object having a Type-Length-Value (TLV) field containing a virtual network identifier binding a network path used to form a portion of one of the end-to-end tunnels to the VN, and instructing a border router managing the domain to establish the network path used to form the portion of one of the end-to-end tunnels.

In an embodiment, the method further comprises receiving an indication from the border router that the network path has been established. In an embodiment, the method further comprises receiving a second message from the first network element, wherein the second message includes the association object having the TLV field containing the virtual network identifier binding a second network path used to form another portion of one of the end-to-end tunnels to the VN.

In an embodiment, the disclosure includes a network element configured to establish end-to-end tunnels extending across multiple domains including a receiver configured to receive a request from a customer controller to implement a virtual network (VN) created by the customer controller, wherein the VN identifies the end-to-end tunnels, a processor coupled to the receiver and configured to map the VN to available resources based on network constraints, and a transmitter coupled to the processor and configured to transmit a message to a network controller managing one of the domains that includes a network path used to form a portion of one of the end-to-end tunnels, wherein the message includes a virtual network identifier binding the network path to the VN.

In an embodiment, the virtual network identifier in the message is identified within a data model. In an embodiment, the virtual network identifier is one of a virtual network name and a tunnel identification (ID). In an embodiment, the message is a PCInitiate Message that conforms to a Path Computational Element Protocol (PCEP).

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The PCEP provides mechanisms for Path Computation Elements (PCEs) to perform path computations in response to Path Computation Clients' (PCCs) requests. IETF draft titled "Applicability of a Stateful Path Computation Element (PCE)" by X. Zhang, et al., published on Oct. 19, 2015, which is hereby incorporated by reference as if reproduced in its entirety, describes general considerations for a stateful PCE deployment and examines its applicability and benefits, as well as its challenges and limitations through a number of use cases. This IETF also describes a set of extensions to PCEP to provide stateful control. A stateful PCE has access to not only the information carried by a network's Interior Gateway Protocol (IGP), but also the set of active paths and their reserved resources for its computations. The additional state allows the PCE to compute constrained paths while considering individual LSPs and their interactions.

IETF draft titled "PCEP Extensions for PCE-initiated LSP Setup in a Stateful PCE Model" by E. Crabbe, et al., published on Oct. 19, 2015, which is hereby incorporated by reference as if reproduced in its entirety, describes the setup, maintenance and teardown of PCE-initiated LSPs under the stateful PCE model. Within the hierarchical PCE architecture, a PCE is used to initiate or delete LSPs to a PCC. IETF draft titled "PCEP Extensions for Establishing Relationships Between Sets of LSPs" by I. Minei, et al., published on Nov. 26, 2015, which is hereby incorporated by reference as if reproduced in its entirety, describes a generic mechanism to create a grouping of LSPs. As used herein, the IETF titled "PCEP Extensions for Establishing Relationships Between Sets of LSPs" is referred to as the "Association Group IETF." The grouping may be used to define the association between sets of LSPs or between a set of LSPs and a set of attributes. IETF draft titled "Requirements for Abstraction and Control of TE Networks" by Y. Lee, et al., published on Oct. 1, 2015, which is hereby incorporated by reference as if reproduced in its entirety, describes various VN operations initiated by a customer/application. In this context, a set of LSPs is associated with a VN "construct" to facilitate VN operations in PCE architecture. This IETF document, which may be referred to as ACTN-REQ, specifies a PCEP extension to associate a set of LSPs based on VN or customer.

Figure 1:
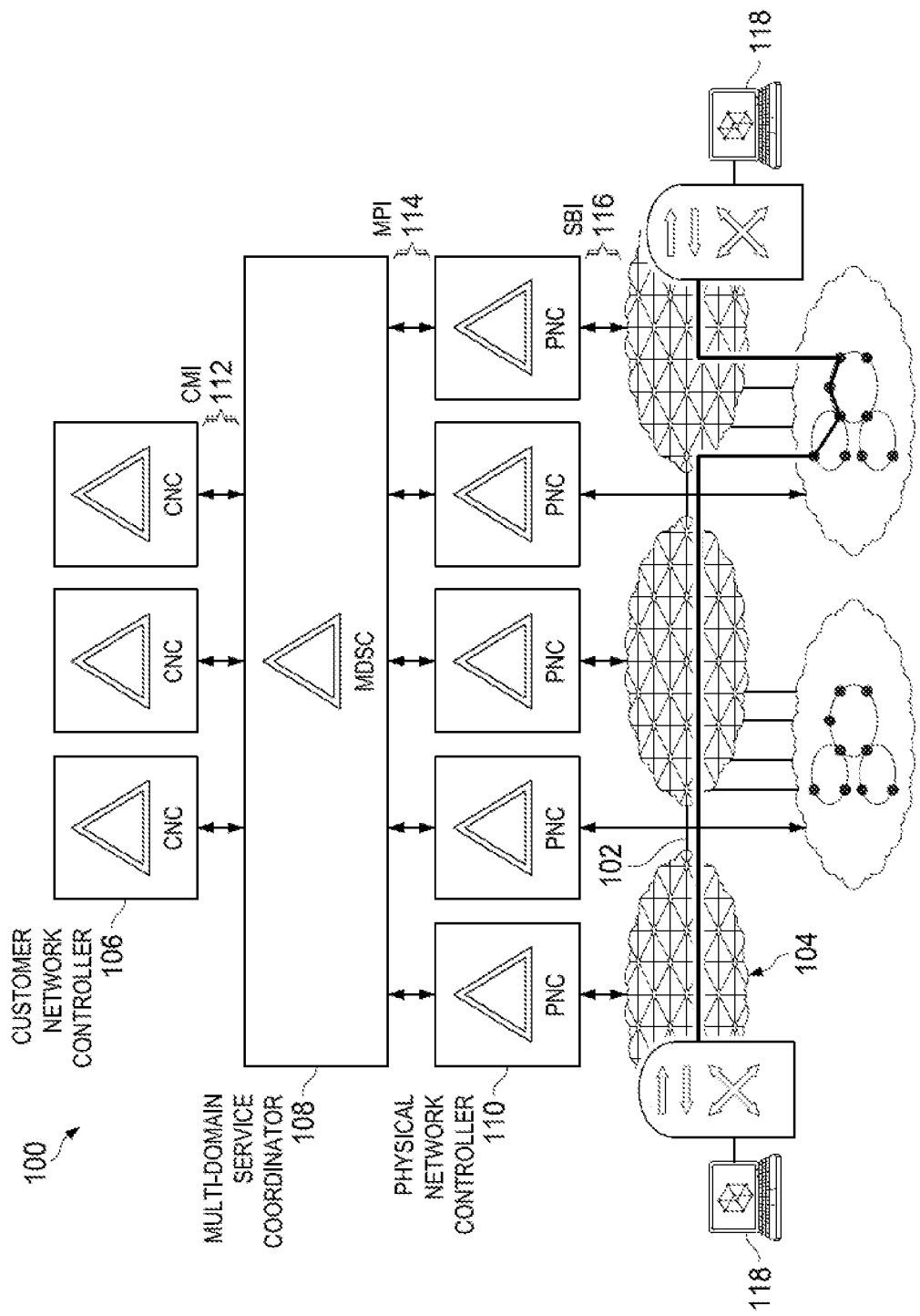
FIG. 1 is a diagram of an overview of a PCEP architecture used to create an end-to-end path through multiple domains.

Referring to FIG. 1, an overview of a PCEP architecture 100 that may be suitable for creating an end-to-end tunnel 102 through multiple domains 104 is illustrated. As shown, the PCEP architecture 100 includes one or more Customer Network Controllers (CNCs) 106, an MDSC 108 (in the Abstraction and Control of Traffic Engineered Networks (ACTN) context), an at least one Physical Network Controller 110 for each of the domains 104 through which the end-to-end path 102 passes. As shown, the end-to-end tunnel 102 extends from one endpoint 118 (e.g., a source) to another endpoint 118 (e.g., a destination).

The CNCs 106 interface with the MDSC 108 over a CNC/MDSC interface (CMI) 112, the MDSC 108 interfaces with the PNCs 110 over a MDSC/PNC (MPI) interface 114, and the PNCs 110 interface with the domains 104 over a southbound interface (SBI) 116. It should be recognized that the PCEP architecture 100 may include other network elements or components and may have other suitable configurations in practical applications as would be appreciated by one skilled in the art upon reviewing this disclosure.

Figure 2:
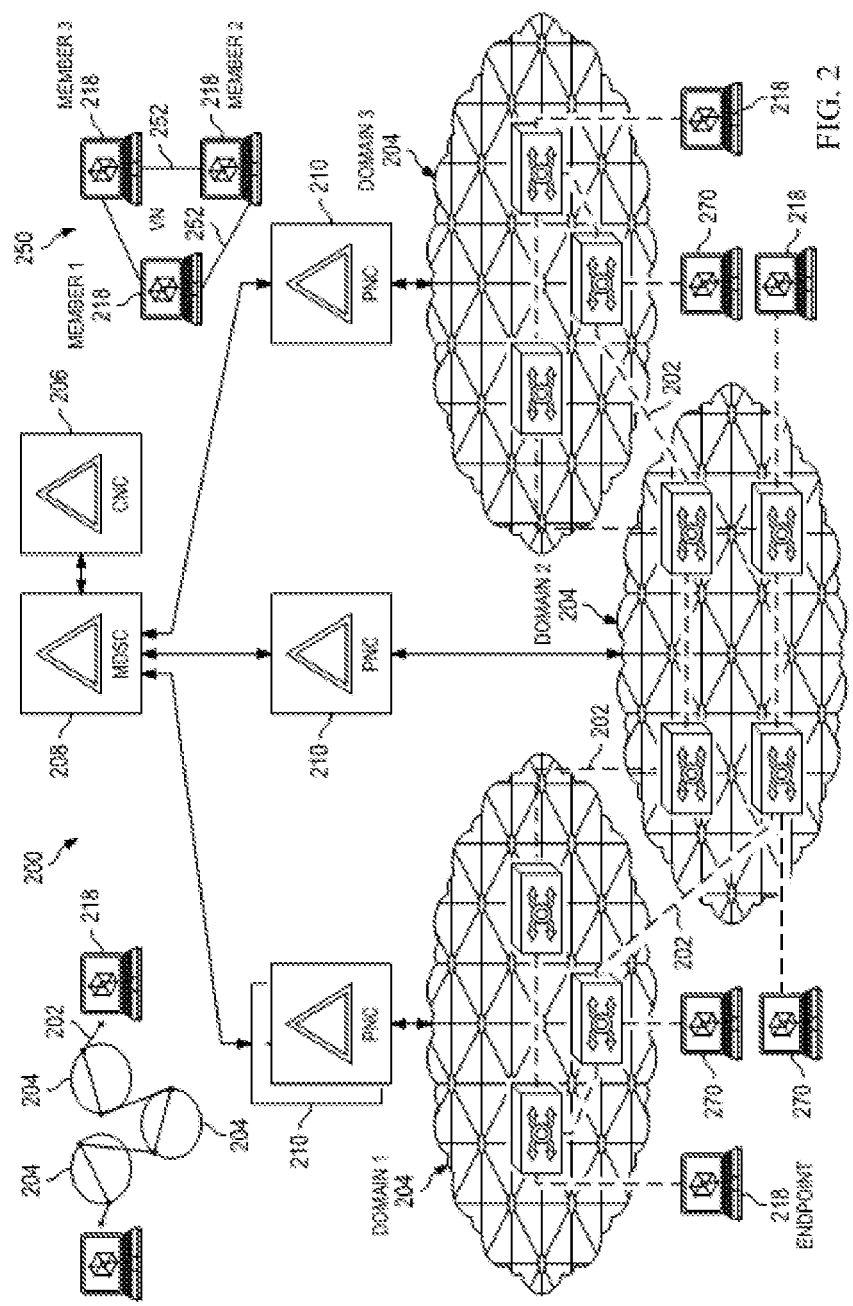
FIG. 2 is a diagram of a messaging scheme used to create end-to-end tunnels through multiple domains.

FIG. 2 is a diagram illustrating a messaging scheme used within a PCEP architecture 200 to create the end-to-end tunnels through multiple domains. The PCEP architecture 200 in FIG. 2 may be similar to the PCEP architecture 100 of FIG. 1. The PCEP architecture 200 of FIG. 2 includes, for example, a CNC 206, a MDSC 208 (also referred to herein as a Parent PCE (P-PCE) in the PCEP context), and at least one PNC 210 (also referred to herein as a Child PCE (C-PCE) in the PCEP context) for each of the domains 204 through which the end-to-end tunnel 202 passes. The CNC 206, MDSC 208, PNC 210, domains 204, and the end-to-end tunnel 202 are similar to the CNC 106, MDSC 108, PNC 110, domains 104, and the end-to-end tunnel 102 of FIG. 1. As shown, several end-to-end tunnels 202 extend between different endpoints 218 in the various domains 204. The endpoints 218 of FIG. 2, which may also be referred to as members (e.g., Member 1, Member 2, Member 3, etc.), are similar to the endpoints 118 of FIG. 1. As shown, one or more border routers 270 may be disposed between the endpoints 218 and included in one or more of the end-to-end tunnels 202.

To begin, the CNC 206 creates a VN 250. The VN 250 may comprise a set of end-to-end tunnels 252 from a customer point of view. These end-to-end tunnels 252 connect endpoints 218 (e.g., a source customer edge (CE), a destination CE, etc.) to each other. The end-to-end tunnels 252 correspond to the end-to-end tunnels 102, 202 of FIGS. 1-2. The VN 250 of FIG. 2 may comprise a number of virtual nodes and virtual links. In other words, the VN 250 may be more than just a tunnel.

Figure 3:
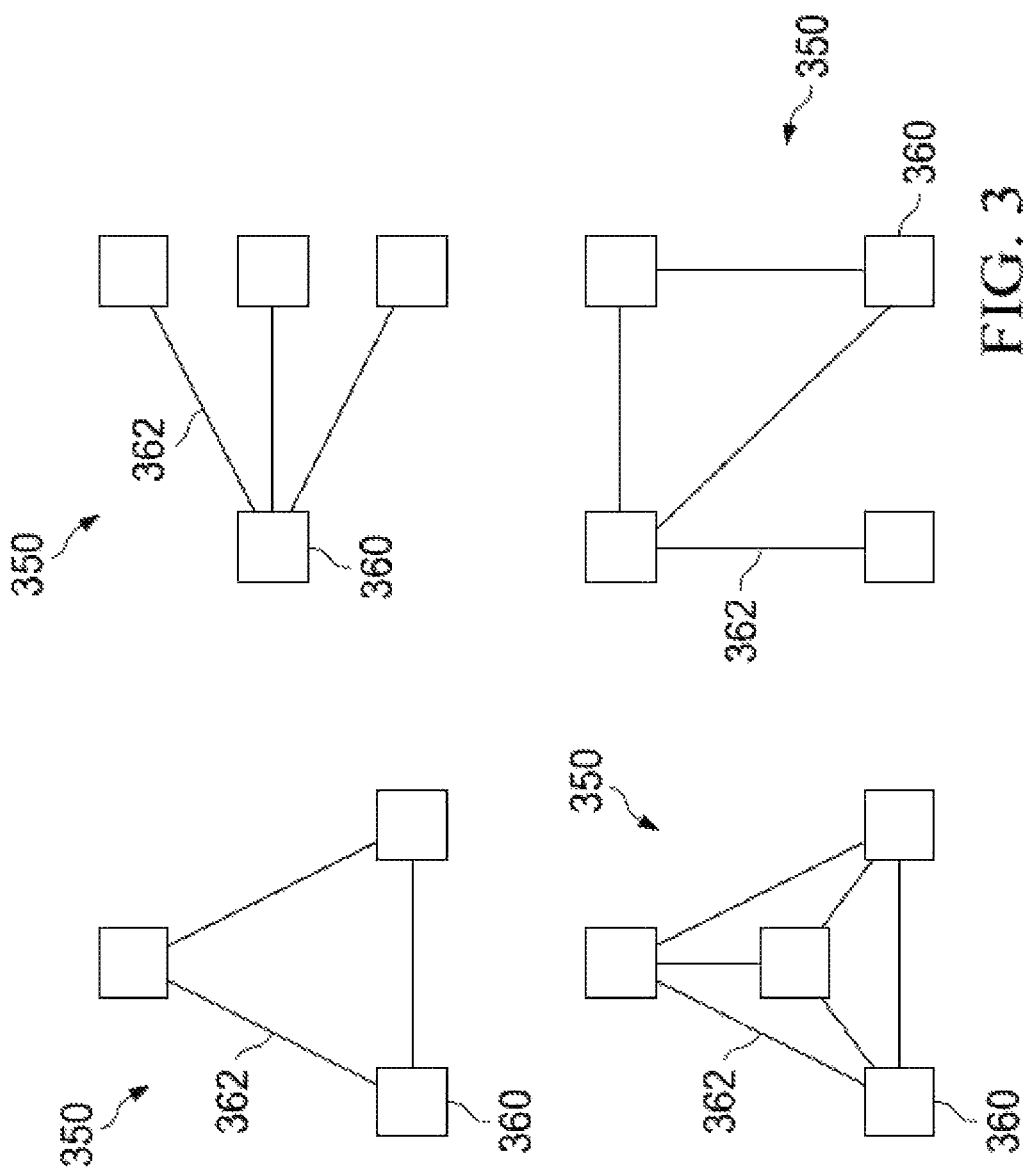
FIG. 3 is a diagram illustrating several configurations for a VN.

FIG. 3 illustrates several example configurations for a VN 350 having virtual tunnels and links. The VN 350 of FIG. 3 may be similar to the VN 250 of FIG. 2. Each of the VNs 350 in FIG. 3 includes virtual nodes 360 connected together by virtual links 362. As well known by those skilled in the art, the virtual nodes 360 and virtual links 362 represent the underlying physical network elements and connections that are abstracted to create the virtual representations.

Figure 4:
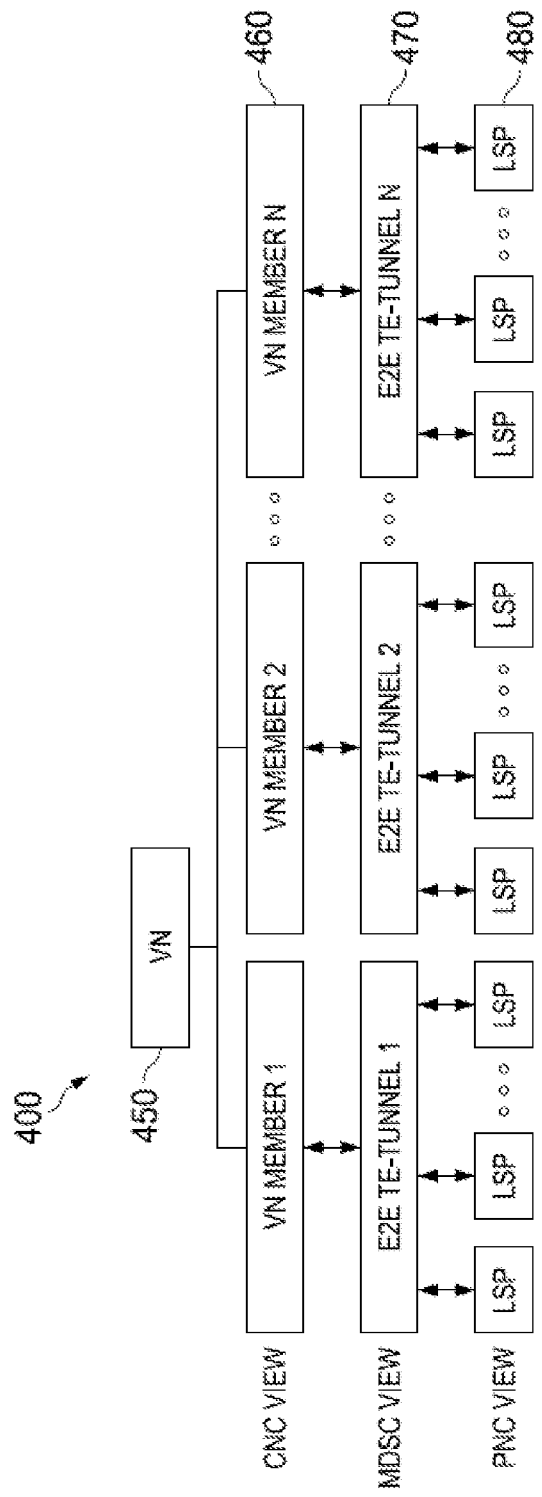
FIG. 4 is a diagram that illustrates the VN relationship as viewed by different entities in the PCEP architecture.

FIG. 4 is a diagram 400 that illustrates a VN relationship from the perspective of different entities in the PCEP architecture 100, 200 of FIGS. 1-2. The VN 450 in FIG. 4 is similar to the VN 250, 350 in FIGS. 2-3. The CNC View in FIG. 4 represents the view from the perspective of the CNC 106, 206 of FIGS. 1-2. From the CNC View, the CNC views the VN 450 as a collection of VN members 460 (e.g., the endpoints 118, 218 of FIGS. 1-2). The MDSC View in FIG. 4 represents the view from the perspective of the MDSC 108, 208 of FIGS. 1-2. From the MDSC view, the MDSC views the VN 450 as a collection of end-to-end tunnels 470 (e.g., the end-to-end tunnels 102, 202 of FIGS. 1-2). The PNC View in FIG. 4 represents the view from the perspective of the PNC 110, 210 of FIGS. 1-2. From the PNC view, the PNC views the VN 450 as a collection of network paths 480 (e.g., LSPs) used to collectively form the end-to-end tunnels.

Referring back to FIG. 2, after the CNC 206 has created the VN 250, the CNC 206 sends a VN instantiate message (as depicted by the arrows) to the MDSC 208. The VN instantiate message is a request by the CNC 206 for the MDSC 208 to implement the VN 250. Once the request is received, the MDSC 208 maps the VN 250 to available resources based on network restraints such as, for example, Quality of Service (QoS), bandwidth, and so on. After the VN 250 has been mapped to the available resources based on the network constraints, the MDSC 208 sends a message (as depicted by the arrows) to the PNCs 210 that instructs the PNCs 210 managing the domains 204 to set up the various network paths needed to form the end-to-end tunnels 202 corresponding to the VN 250. The PNCs 210 perform this operation by communicating with the endpoints 218 and/or border routers 270 disposed in the domains 204. Once the end-to-end tunnels 202 have been established, the endpoints 218 and/or border routers 270 send a message back to the PNCs 210 (as depicted by the arrows) to indicate that the end-to-end tunnels 202 have been established. In similar fashion, the PNCs 210 send a message back to the MDSC 208 and the MDSC 208 sends a message back to the CNC 206 to report that the end-to-end tunnels 202 have been established in a manner corresponding to the VN 250 created by the CNC 206.

Unfortunately, in the process depicted by FIG. 2 the network paths (e.g., LSPs) used to form the end-to-end tunnels 202 are not associated or bound to the VN 250. In other words, there is no relationship between the VN 250 and the network paths used to collectively form the end-to-end tunnels 202.

Disclosed herein is a method and apparatus that establish a relationship between a VN and sets of LSPs when end-to-end tunnels extending across multiple domains are established. In other words, the VN is bound to or associated with one or more LSPs that form a portion of the end-to-end tunnels. The binding relationship may be accomplished using PCEP Extensions or a data model (e.g., the Yang data model). When VNs are bound to LSPs, customers are able to orchestrate the VN they create from a service perspective. In addition, operators are able to orchestrate LSPs associated with the VN of the customer seamlessly and efficiently over multi-domain networks from a network perspective.

Figure 5:
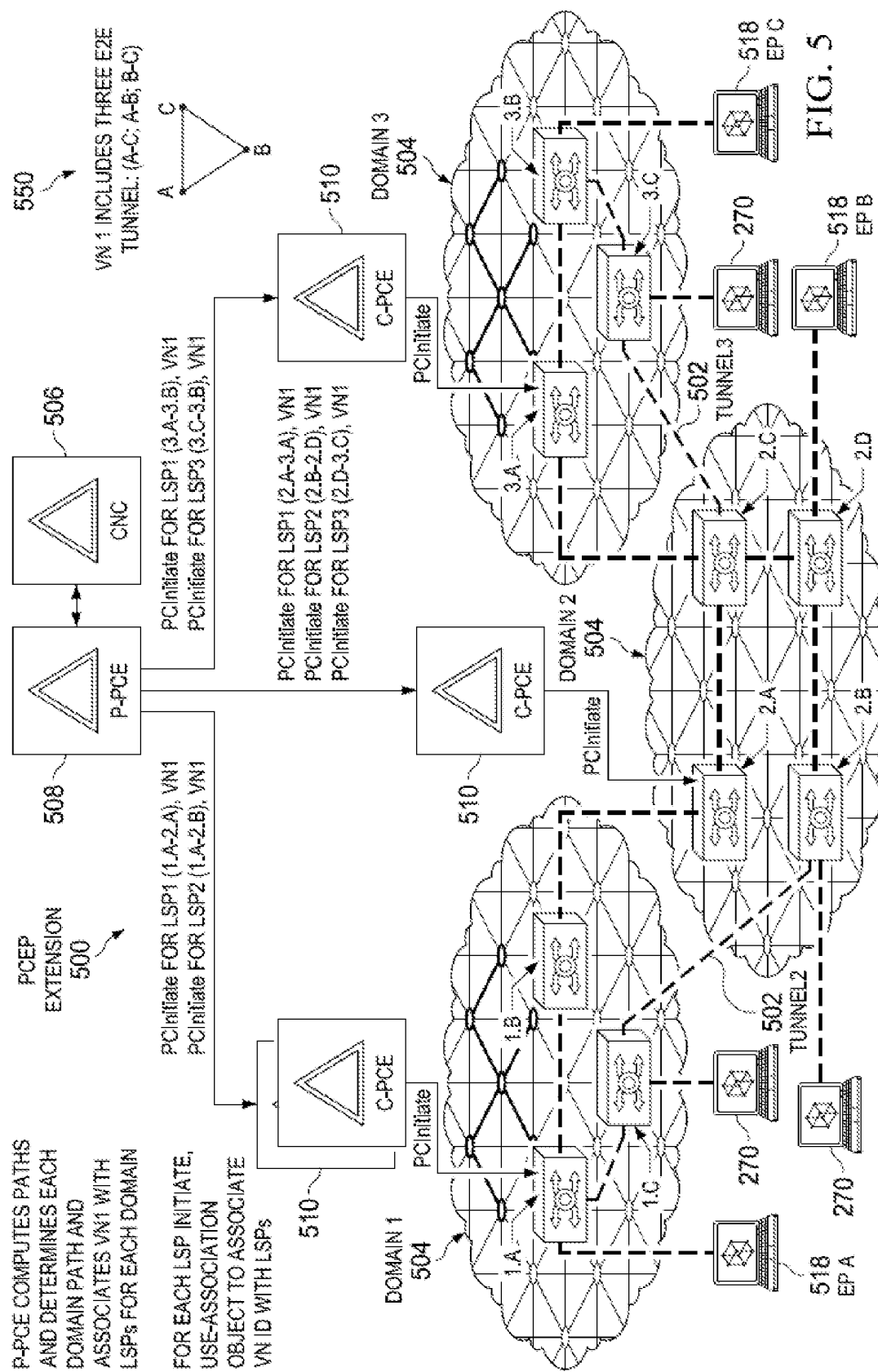
FIG. 5 is a diagram depicting an embodiment of a PCInitiate procedure that binds the VNs to the network paths for each domain when the end-to-end path is created.

FIG. 5 is a diagram depicting an embodiment of a PCInitiate procedure used within the context of a PCEP architecture 500 to bind the VNs to the network paths for each domain when the end-to-end path is created. The PCEP architecture 500 of FIG. 5 is similar to the to the PCEP architecture 100, 200 of FIGS. 1-2. The PCEP architecture 500 of FIG. 5 includes, for example, a CNC 506, a P-PCE 508, and at least one C-PCE 510 for each of the domains 504 (individually labeled Domain1, Domain2, and Domain3) through which the end-to-end tunnel 502 passes. The CNC 506, P-PCE 508, C-PCEs 510, domains 504, and the end-to-end tunnel 502 are similar to the CNC 106, 206, MDSC 108, 208, PNC 110, 210, domains 104, 204, and the end-to-end tunnel 102, 202 of FIGS. 1-2. As shown, several end-to-end tunnels 502 (individually labeled Tunnel1, Tunnel2, and Tunnel3) extend between different endpoints 518 in the various domains 504. The endpoints 518 of FIG. 5 are similar to the endpoints 118, 218 of FIGS. 1-2. As shown, one or more border routers 570 may be disposed between the endpoints 518 and included in one or more of the end-to-end tunnels 502. For ease of description, the border routers 570 and endpoints 518 in FIG. 5 have been individually labeled 1.A, 1.B., 1.C, 2.A, 2.B., 2.C, and 3.A, 3.B., 3.C.

After the CNC 506 has created the VN 550 (labeled as VN1), the CNC 506 sends a PCInitiate message (as depicted by the arrows) to the P-PCE 508. The PCInitiate message is a request by the CNC 506 for the P-PCE 508 to implement the VN 550. Once the request is received, the P-PCE 508 maps the VN 550 to available resources based on network restraints such as, for example, Quality of Service (QoS), bandwidth, and so on. After the VN 550 has been mapped to the available resources based on the network constraints, the P-PCE 508 sends a message (as depicted by the arrows) to the C-PCEs 510 that instructs the C-PCEs 510 managing the domains 504 to set up the various network paths needed to form the end-to-end tunnels 502 corresponding to the VN 550. The C-PCEs 510 perform this operation by communicating with the endpoints 518 and/or border routers 570 disposed in the domains 504. Once the end-to-end tunnels 502 have been established, the endpoints 518 and/or border routers 570 send a message back to the C-PCEs 510 (as depicted by the arrows) to indicate that the end-to-end tunnels 502 have been established. In similar fashion, the C-PCEs 510 send a message back to the P-PCE 508 and the P-PCE 208 sends a message back to the CNC 506 to report that the end-to-end tunnels 502 have been established in a manner corresponding to the VN 550 created by the CNC 506.

Unlike the procedure used in FIG. 2, the procedure of FIG. 5 binds each of the network paths in the domains 504 to the VN 550. For example, a PCInitiate message (or messages) is used to bind LSP1 (1.A-2.A) to VN1 and LSP2 (1.A-2.B) to VN1 for Domain1. Likewise, a PCInitiate message (or messages) is used to bind LSP1 (2.A-3.A) to VN1, LSP2 (2.B-2.D) to VN1, and LSP3 (2.D-3.C) to VN1 for Domain2. In addition, a PCInitiate message (or messages) is used to bind LSP1 (3.A-3.B) to VN1 and LSP3 (3.0-3.B) to VN1 for Domain3. Collectively, one or more of the LSPs bound to, or associated with, the VN1 are used to form the end-to-end tunnels 502.

Because a relationship is established between VN1 and each of the LSPs, customers are capable of orchestrating their VN efficiently from a service perspective, while the operators are able to seamlessly and efficiently orchestrate the LSPs associated with the VN from a network perspective.

Figure 6:
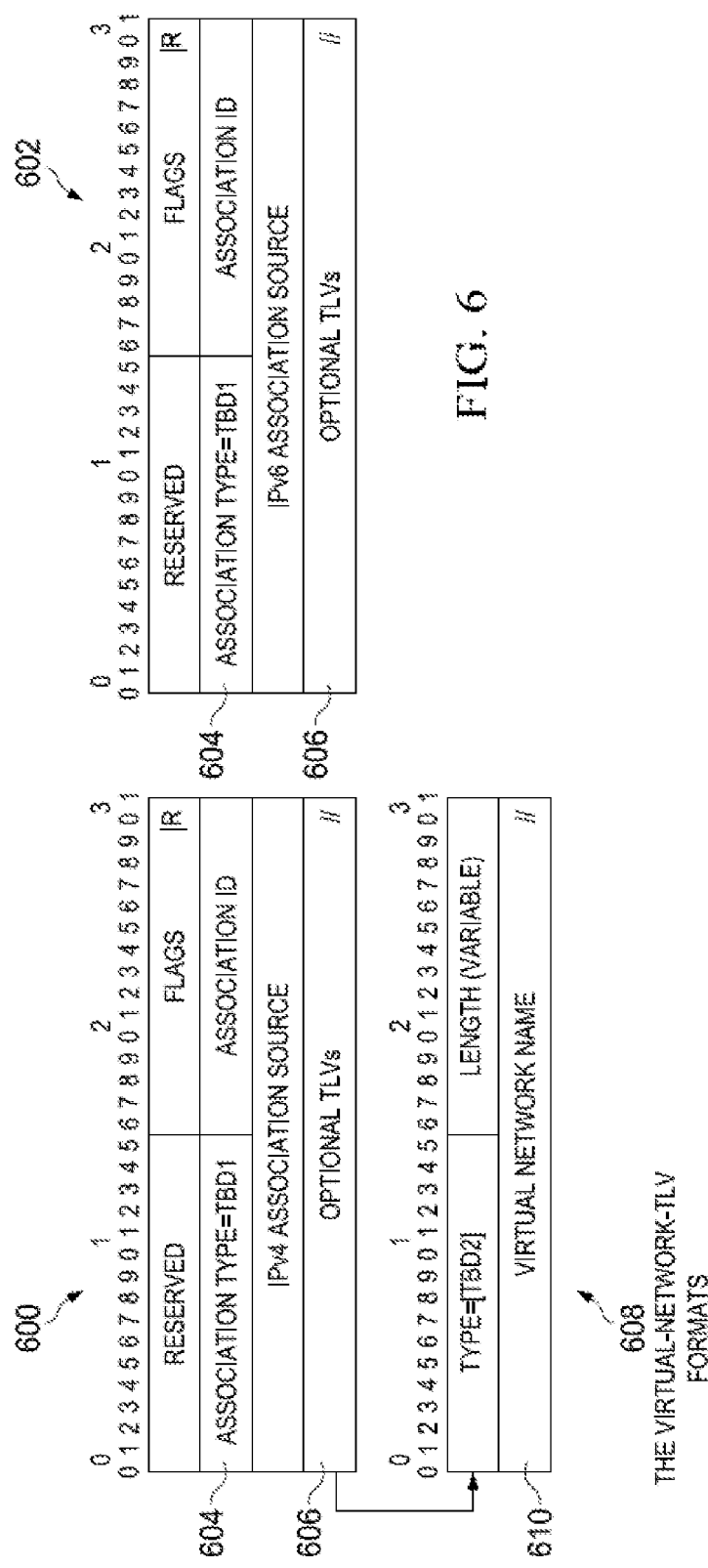
FIG. 6 is an embodiment of a new Virtual Association Group (VNAG) Object format for use with the PCEP extension scheme of FIG. 5.

In order to facilitate the binding relationship noted above, a new optional association object-type is defined based on the generic association object referred to herein as the VNAG. In addition, a new association type called "VN Association Type" having a predetermined value is also defined. The scope and handling of the VNAG identifier is similar to the generic association identifier defined in the Association Group IETF. FIG. 6 illustrates a VNAG object 600 for Internet Protocol version 4 (IPv4) and another for Internet Protocol version 6 (IPv6). Each of the VNAG objects 600, 602 includes an Association Type field 604 carrying a to-be-determined (TBD) value. While the value is depicted in FIG. 6 as TBD1, it should be recognized that the value may be any predetermined value. In an embodiment, the value may be assigned by the Internet Assigned Numbers Authority (IANA) or other authority.

Including the value of TBD1 (which may be any predetermined value) within the Association Type field 604 signals or indicates that the Optional type-length-values (TLVs) field 606 contains a new TLV 608 that includes a virtual network identifier 610. In an embodiment, the virtual network identifier 608 is a Virtual Network Name, a Virtual Network ID, or some other suitable identifier. The virtual network identifier 608 within the new TLV 608 is used, for example, to bind a VN and a network path used to generate a tunnel. For example, the virtual network identifier 608 is used to bind VN1 as shown in FIG. 5 to LSP1 (1.A-2.A) and so on as previously described.

The definition for other fields in the VNAG object formats of FIG. 6 is provided in the Association Group IETF. In an embodiment, network constraints such as QoS, bandwidth, and so on may be included in the other fields of the VANG object 600. The length field may be variable in length.

RFC document RFC6805 titled "The Application of the Path Computation Element Architecture to the Determination of a Sequence of Domains in MPLS and GMPLS" by D. King, et al., published in November, 2012, which is hereby incorporated by reference as if reproduced in its entirety, describes a Hierarchical PCE (H-PCE) architecture used for computing end-to-end (E2E or e2e) paths for inter-domain Multiprotocol Label Switching (MPLS) TE and Generalized Multiprotocol Label Switching (GMPLS) LSPs. Within the H-PCE architecture, the parent PCE is used to compute a multi-domain path based on the domain connectivity information. A child PCE may be responsible for a single domain or multiple domains, and is used to compute the intra-domain path based on its domain topology information.

IETF draft titled "Hierarchical Stateful Path Computation Element (PCE)" by D. Dhody, et al., published February 2016, which is incorporated herein in its entirety, describes general considerations for stateful PCE(s) in a H-PCE architecture. In particular, the behavior changes and additions to the existing stateful PCE mechanisms in the context of a H-PCE architecture.

In Stateful H-PCE architecture, the P-PCE receives a virtual network creation request by its client over its Northbound Application Programming Interface (API). This VN is uniquely identified by an Association ID in VNAG as well as by the VIRTUAL-NETWORK name. This VN may comprise multiple LSPs in the network in a single domain or across multiple domains.

Figure 7:
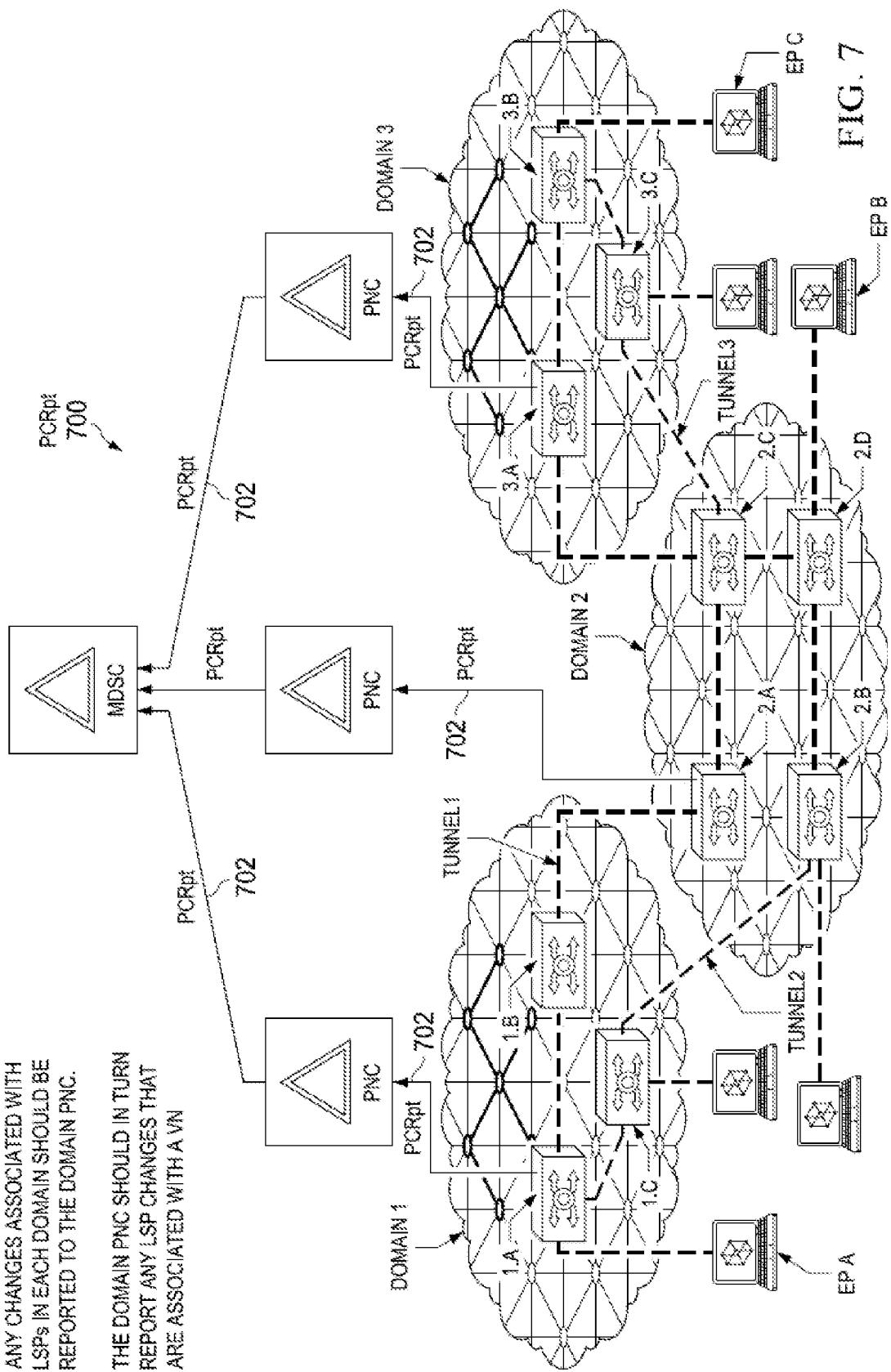
FIG. 7 is a schematic diagram of a PCRcpt Message procedure that follows the PCInitiate procedure of FIG. 5.

Whenever changes occur with the instantiated LSP in a domain network, the domain child PCE or PNC reports the changes using a PCRpt Message 702 as depicted by the process 700 in FIG. 7. The architecture in FIG. 7 is similar to the architecture in FIGS. 1, 2, and 5 and, therefore, for the sake of brevity will not be repeated. The PCRpt Message 702 includes the VNAG Object 600, 602 of FIG. 6 to indicate the relationship between the LSPs and the VN.

Figure 8:
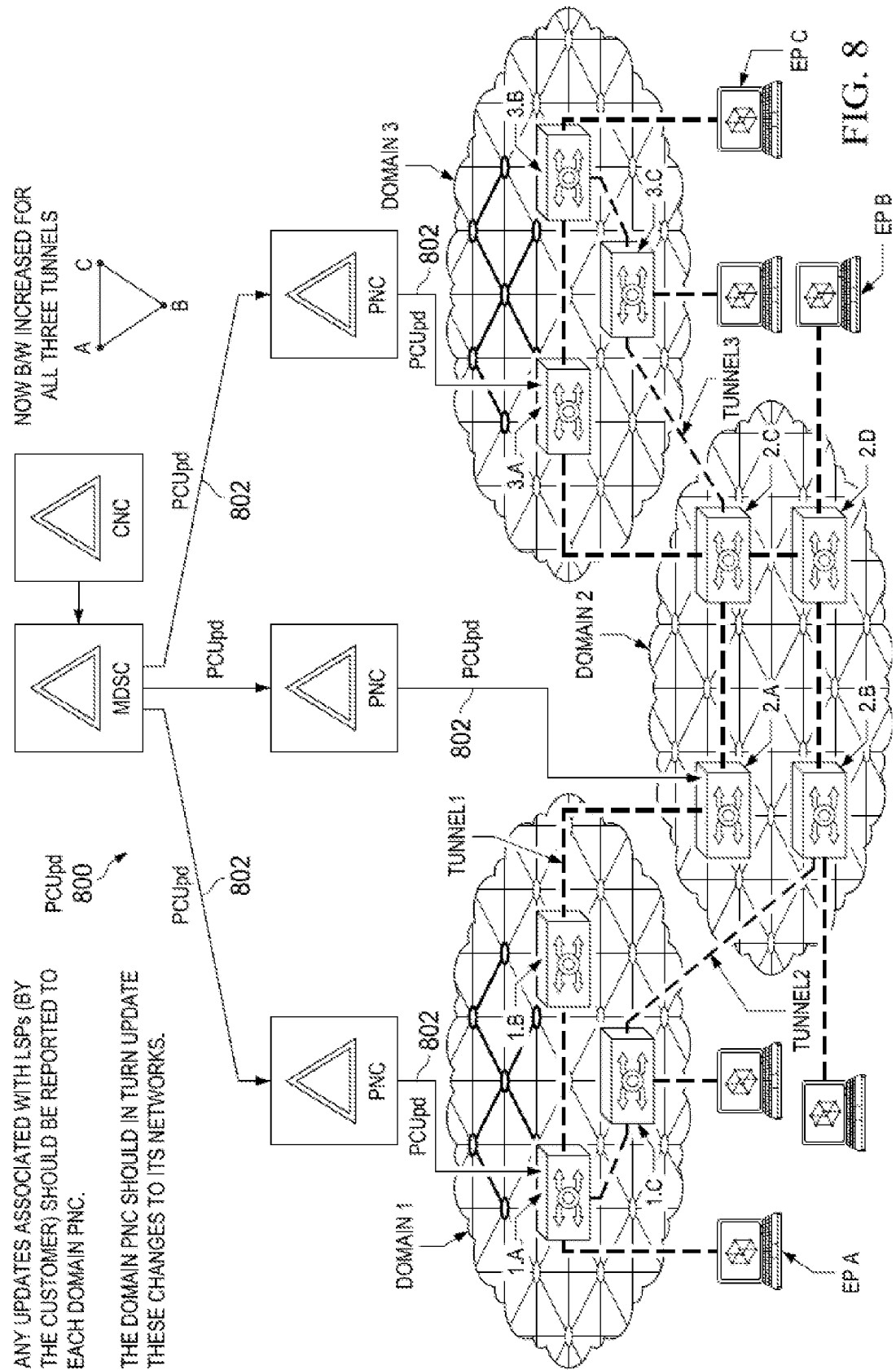
FIG. 8 is a schematic diagram of a PCUpd Message procedure that follows the PCRcpt procedure of FIG. 7.

Whenever an update (e.g., the bandwidth (B/W or BW) is increased for all three tunnels) occurs with VNs in the P-PCE or MDSC (via the client's request), the P-PCE or MDSC sends a PCUpd Message 802 as depicted by the process 800 in FIG. 8. The PCUpd Message 802 is used to inform each affected child PCE or PNC of changes. The PCUpd Message includes the VNAG Object 600, 602 of FIG. 6. The PCUpd Message 802 is referred to as an update because it is sent after the end-to-end tunnels have been establishing using the PCInitiate procedure described above.

If a PCEP speaker receives the VNAG object 600, 602 without the VN identifier (e.g., a VIRTUAL-NETWORK-TLV), a PCErr message with Error-Type=6 (mandatory object missing) and Error-Value=TBD3 (VIRTUAL-NETWORK-TLV missing) are sent and the session is closed.

Figure 9:
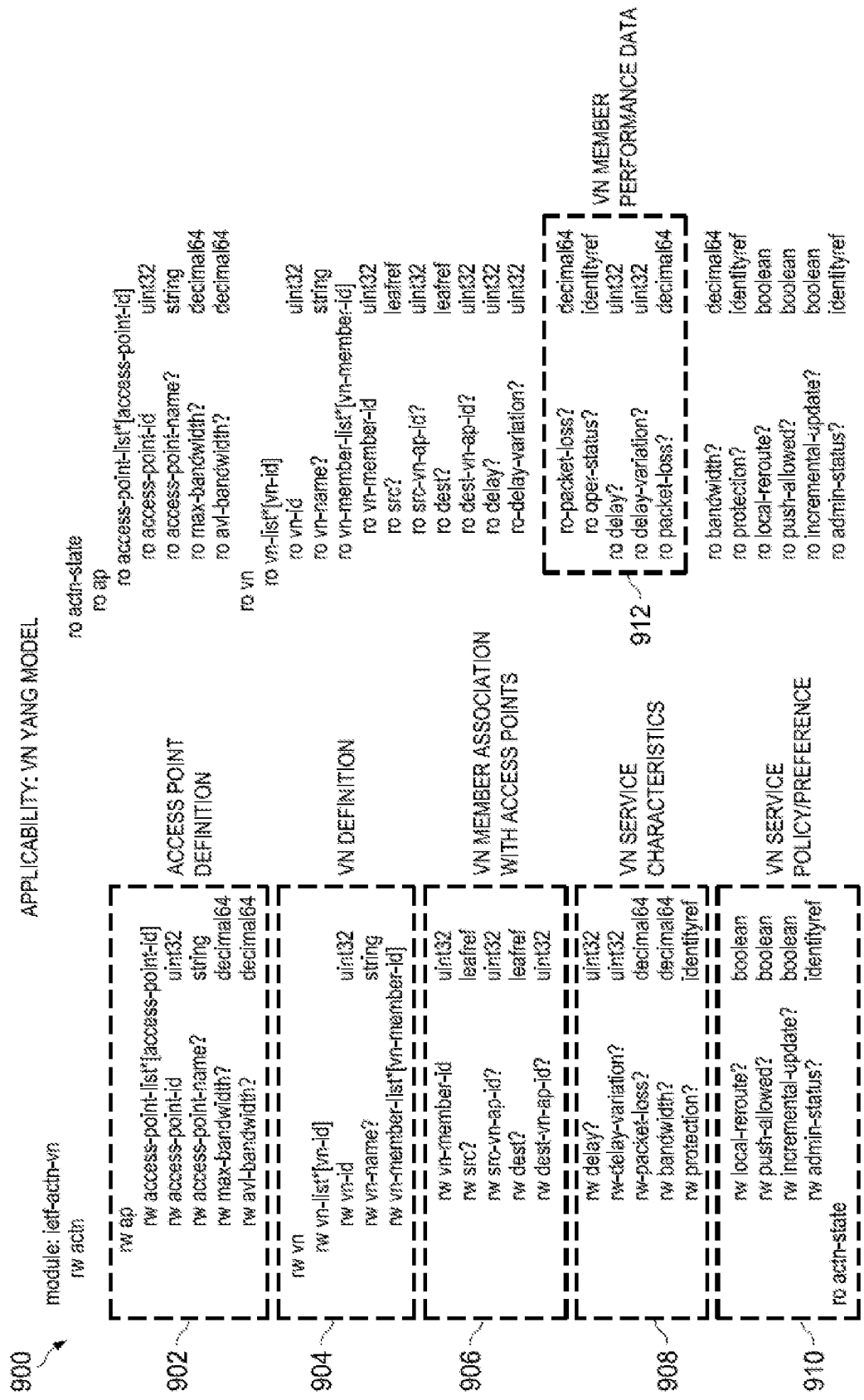
FIG. 9 is a data model consistent with the data modeling language proposed in the IETF RFC 6020 document.

FIG. 9 is a data model 900 consistent with the data modeling language proposed in the IETF RFC 6020 document. In an embodiment, binding process described herein may be implemented using the data model 900 of FIG. 9. In such an embodiment, a message containing information disclosed in the data model 900 is transmitted and/or received instead of transmitting and/or receiving the PCInitiate message as described above. In other words, each segment of network path used to create end-to-end tunnels may be bound to the VN by transmitting a message containing information disclosed in the data model 900. In an embodiment, the data model 900 includes an access point definition 902, a VN definition 904, VN Member Association with Access points 906, VN Service Characteristics 908, VN Service/Policy Preference 910, and VN Member Performance Data 912. Other information may also be included in the data model.

Figure 10:
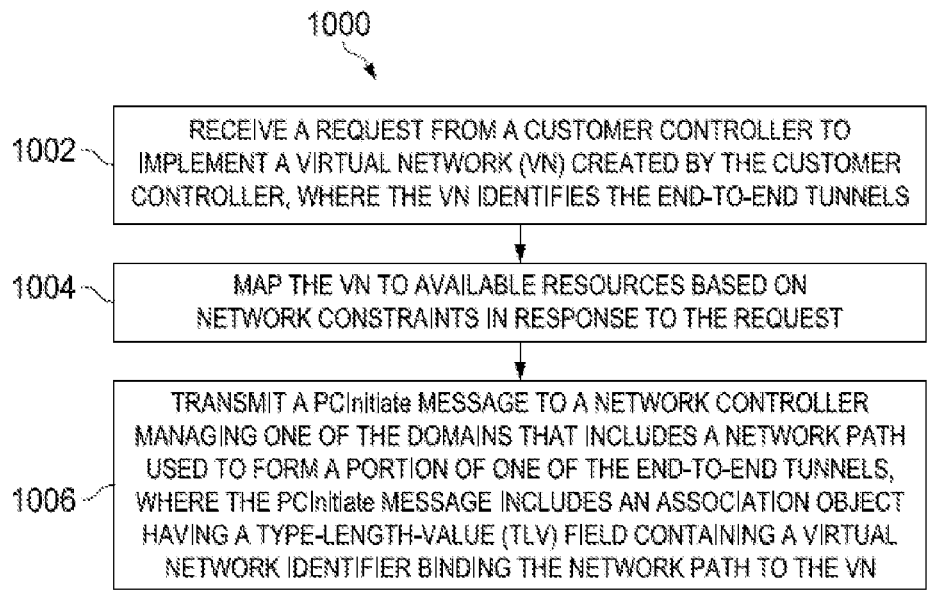
FIG. 10 is a method of establishing end-to-end tunnels extending across multiple domains using a network element.

FIG. 10 is a method 1000 of establishing end-to-end tunnels extending across multiple domains using a network element. The method 1000 may be performed when end-to-end tunnels corresponding to a VN created by a customer are to be established. In an embodiment, the method 1000 may be performed by a Software Defined Controller (SDN), an MDSC, or a P-PCE (e.g., the P-PCE 508 of FIG. 5). At step 1002, a request from a customer controller to implement a VN created by the customer controller is received. The VN identifies the end-to-end tunnels. At step 1004, the VN is mapped to available resources based on network constraints in response to the request. At step 1006, a PCInitiate Message is transmitted to a network controller managing one of the domains. The domain includes a network path used to form a portion of one of the end-to-end tunnels. The PCInitiate Message includes an association object having a TLV field containing a virtual network identifier binding the network path to the VN.

Figure 11:
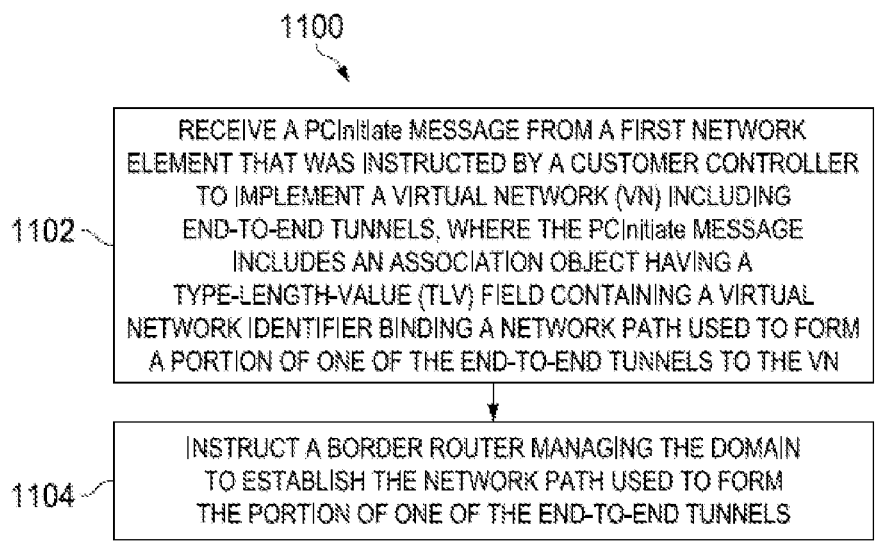
FIG. 11 is a method of establishing end-to-end tunnels extending across multiple domains implemented by a network controller managing one of the domains.

FIG. 11 is a method 1100 of establishing end-to-end tunnels extending across multiple domains implemented by a network controller managing one of the domains. The method 1100 may be performed when end-to-end tunnels corresponding to a VN created by a customer are to be established. In an embodiment, the method 1100 may be performed by a PNC or a C-PCE (e.g., the C-PCE 510 of FIG. 5). At step 1102, a PCInitiate Message is received from a first network element (e.g., an MDSC or a P-PCE) that was instructed by a customer controller (e.g., a CNC) to implement a VN including the end-to-end tunnels. The PCInitiate message includes an association object having a TLV field containing a virtual network identifier binding a network path used to form a portion of one of the end-to-end tunnels to the VN. At step 1104, a border router managing the domain is instructed to establish the network path used to form the portion of one of the end-to-end tunnels.

Figure 12:
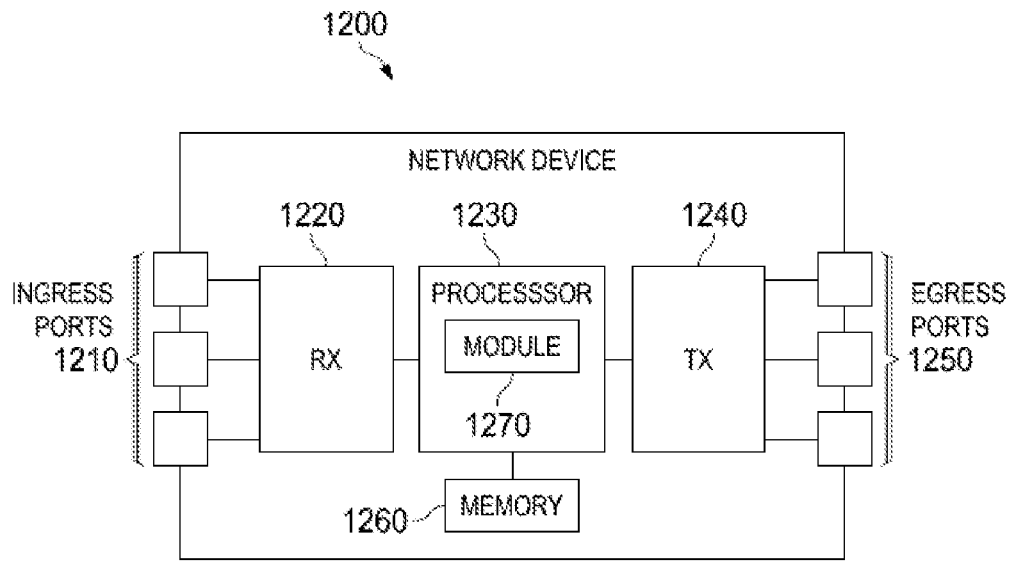
FIG. 12 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 12 is a schematic diagram of a network device 1200 according to an embodiment of the disclosure. The device 1200 is suitable for implementing the disclosed embodiments as described herein. The device 1200 comprises ingress ports 1210 and receiver units (Rx) 1220 for receiving data; a processor, logic unit, or central processing unit (CPU) 1230 to process the data; transmitter units (Tx) 1240 and egress ports 1250 for transmitting the data; and a memory 1260 for storing the data. The device 1200 may also comprise optical-to-electrical (OE) components and electrical-to-optical (EO) components coupled to the ingress ports 1210, the receiver units 1220, the transmitter units 1240, and the egress ports 1250 for egress or ingress of optical or electrical signals.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the ingress ports 1210, receiver units 1220, transmitter units 1240, egress ports 1250, and memory 1260. The processor 1230 comprises a binding module 1270. The binding module 1270 implements the disclosed embodiments described above. For instance, the binding module 1270 generates or facilitates the transmission of the messages carrying the PCInitiate message or the data model having the virtual network identifier that binds network paths to the VN. The inclusion of the binding module 1270 therefore provides a substantial improvement to the functionality of the device 1200 and effects a transformation of the device 1200 to a different state. Alternatively, the binding module 1270 is implemented as instructions stored in the memory 1260 and executed by the processor 1230.

The memory 1260 comprises one or more disks, tape drives, and solid-state drives and may be used as an over-flow data storage device, to store programs when such programs are selected for execution, and to store instructions and data that are read during program execution. The memory 1260 may be volatile and non-volatile and may be read-only memory (ROM), random-access memory (RAM), ternary content-addressable memory (TCAM), and static random-access memory (SRAM).

Figure 13:
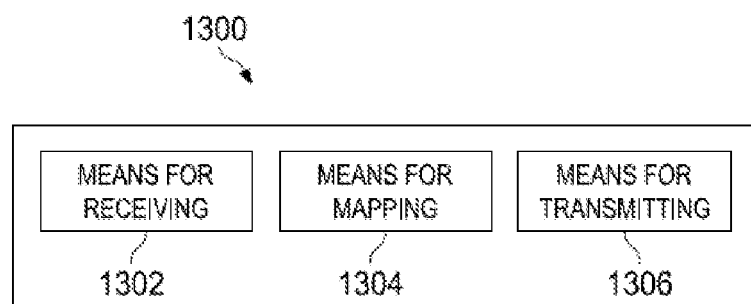
FIG. 13 is an apparatus configured to implement one or more of the methods disclosed herein.

FIG. 13 illustrates is an apparatus 1300 configured to implement one or more of the methods described herein such as, for example, the method 1000 of FIG. 10. The apparatus 1300 comprises means 1302 for receiving a request from a customer controller to implement a virtual network (VN) created by the customer controller, where the VN identifies the end-to-end tunnels extending across the multiple domains, means for mapping 1304 the VN to available resources based on network constraints in response to the request, and means for transmitting 1306, after the VN has been mapped, a message to a network controller managing one of the domains that includes a network path used to form a portion of one of the end-to-end tunnels, where the message includes an association object having a Type-Length-Value (TLV) field containing a virtual network identifier binding the network path to the VN.

Figure 14:
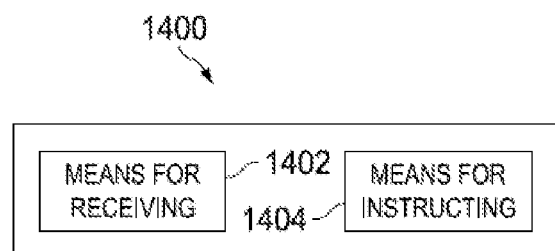
FIG. 14 is an apparatus configured to implement one or more of the methods disclosed herein.

FIG. 14 illustrates is an apparatus 1400 configured to implement one or more of the methods disclosed herein such as, for example, the method of FIG. 11. The apparatus 1400 comprises means for receiving 1402 a message from a first network element that was instructed by a customer controller to implement a virtual network (VN) including the end-to-end tunnels, where the message includes an association object having a Type-Length-Value (TLV) field containing a virtual network identifier binding a network path used to form a portion of one of the end-to-end tunnels to the VN, and means for instructing 1404 a border router managing the domain to establish the network path used to form the portion of one of the end-to-end tunnels.

Disclosed herein is a network element configured to establish end-to-end tunnels extending across multiple domains. The network element includes means for receiving a request from a customer controller to implement a virtual network (VN) created by the customer controller, wherein the VN identifies the end-to-end tunnels, means for mapping the VN to available resources based on network constraints, and means for transmitting a message to a network controller managing one of the domains that includes a network path used to form a portion of one of the end-to-end tunnels, wherein the message includes a virtual network identifier binding the network path to the VN.

Additional embodiments are cited in the following clauses.

Clause 1. A method of establishing end-to-end tunnels extending across multiple domains using a network element, comprising:

receiving a request from a customer controller to implement a virtual network (VN) created by the customer controller, wherein the VN identifies the end-to-end tunnels extending across the multiple domains;

mapping the VN to available resources based on network constraints in response to the request; and transmitting, after the VN has been mapped, a message to a network controller managing one of the domains that includes a network path used to form a portion of one of the end-to-end tunnels, wherein the message includes an association object having a Type-Length-Value (TLV) field containing a virtual network identifier binding the network path to the VN.

Clause 2. The method of claim 1, wherein the network element is a Multi Domain Service Coordinator (MDSC) and the network controller is a Provider Network Controller (PNC).

Clause 3. The method of any one of clauses 1-2, wherein the network element is Parent Path Computational Element (P-PCE) and the network controller is a Child PCE.

Clause 4. The method of any one of clauses 1-3, wherein the customer controller is a Customer Network Controller (CNC).

Clause 5. The method of any one of clauses 1-4, wherein the association object is a Virtual Network Association Group (VNAG) object.

Clause 6. The method of any one of clauses 1-5, wherein the network path is a label switched paths (LSPs).

Clause 7. The method of any one of clauses 1-6, wherein the virtual network identifier is one of a VN name and a tunnel identification (ID).

Clause 8. The method of any one of clauses 1-7, wherein the network constraints comprise at least one of quality of service (QoS) and bandwidth.

Clause 9. The method of any one of clauses 1-8, wherein the message is a PCInitiate message that conforms to a Path Computational Element Protocol (PCEP).

Clause 10. The method of any one of clauses 1-9, wherein the message is established using a data model.

Clause 11. The method of any one of clauses 1-10, wherein one of the messages is transmitted to one of the network controllers for each of the network paths that may be used to form the end-to-end tunnels.

Clause 12. The method of any one of clauses 1-11, further comprising receiving, from each of the network controllers, a report message indicating a status of the network paths managed by the network controllers.

Clause 13. The method of any one of clauses 1-12, further comprising sending, to one or more of the network controllers, an update message after the message has been transmitted, wherein the update message indicates any changes made to the VN by the customer controller.

Clause 14. A method of establishing end-to-end tunnels extending across multiple domains implemented by a network controller managing a domain, comprising:

receiving a message from a first network element that was instructed by a customer controller to implement a virtual network (VN) including the end-to-end tunnels, wherein the message includes an association object having a Type-Length-Value (TLV) field containing a virtual network identifier binding a network path used to form a portion of one of the end-to-end tunnels to the VN; and instructing a border router managing the domain to establish the network path used to form the portion of one of the end-to-end tunnels.

Clause 15. The method of clause 14, further comprising receiving an indication from the border router that the network path has been established.

Clause 16. The method of any one of clauses 14-15, further comprising receiving a second message from the first network element, wherein the second message includes the association object having the TLV field containing the virtual network identifier binding a second network path used to form another portion of one of the end-to-end tunnels to the VN.

Clause 17. A network element configured to establish end-to-end tunnels extending across multiple domains, comprising:

a receiver configured to receive a request from a customer controller to implement a virtual network (VN) created by the customer controller, wherein the VN identifies the end-to-end tunnels;

a processor coupled to the receiver and configured to map the VN to available resources based on network constraints; and a transmitter coupled to the processor and configured to transmit a message to a network controller managing one of the domains that includes a network path used to form a portion of one of the end-to-end tunnels, wherein the message includes a virtual network identifier binding the network path to the VN.

Clause 18. The network element of clause 17, wherein the virtual network identifier in the message is identified within a data model.

Clause 19. The network element of any one of clauses 17-18, wherein the virtual network identifier is one of a virtual network name and a tunnel identification (ID).

Clause 20. The network element of any one of clauses 17-19, wherein the message is a PCInitiate Message that conforms to a Path Computational Element Protocol (PCEP).

Clause 21. A method of establishing end-to-end tunnels extending across multiple domains using a network element, comprising:

associating a virtual network (VN) with available resources based on network constraints, wherein the VN is associated with the end-to-end tunnels extending across the multiple domains; and transmitting a message to a network controller managing one of the domains that includes a network path used to form a portion of one of the end-to-end tunnels, wherein the message includes an association object having a Type-Length-Value (TLV) field containing a virtual network identifier binding the network path to the VN, and the message conforms to a Path Computational Element Protocol (PCEP).

Clause 22. The method of Clause 21, wherein before the associating the VN with available resources based on network constraints, further comprising:

receiving, a request from a customer controller to implement the VN.

Clause 23. The method of Clause 21 or 22, wherein the virtual network identifier is one of a VN name and a tunnel identification (ID).

Clause 24. The method of any one of Clauses 21 to 23, wherein the network constraints comprise at least one of quality of service (QoS) and bandwidth.

Clause 25. The method of any one of Clauses 21 to 24, wherein the message is a PCInitiate message.

Clause 26. The method of any one of Clauses 21 to 25, further comprising receiving, from each of the network controllers, a report message indicating a status of the network paths managed by the network controllers.

Clause 27. The method of any one of Clauses 21 to 26, further comprising sending, to one or more of the network controllers, an update message which indicates any changes made to the VN by the customer controller.

Clause 28. A method of establishing end-to-end tunnels extending across multiple domains implemented by a network controller managing a domain, comprising:

receiving a message from a network element that was instructed to implement a virtual network (VN) associated with the end-to-end tunnels, wherein the message includes an association object having a Type-Length-Value (TLV) field containing a virtual network identifier binding a network path used to form a portion of one of the end-to-end tunnels corresponding to the VN, and the message conforms to ta Path Computational Element Protocol (PCEP); and instructing a device managing the domain to establish the network path used to form the portion of one of the end-to-end tunnels.

Clause 29. The method of Clause 28, further comprising receiving an indication from the device that the network path has been established.

Clause 30. The method of Clause 28 or 29, further comprising receiving a second message from the first network element, wherein the second message includes the association object having the TLV field containing the virtual network identifier binding a second network path used to form another portion of one of the end-to-end tunnels to the VN.

Clause 31. A network element configured to establish end-to-end tunnels extending across multiple domains, comprising:

a processor configured to associate a virtual network VN with available resources based on network constraints, wherein the VN is associated with the end-to-end tunnels; and a transmitter coupled to the processor and configured to transmit a message to a network controller managing one of the domains that includes a network path used to form a portion of one of the end-to-end tunnels, wherein the message includes an association object having a Type-Length-Value (TLV) field containing a virtual network identifier binding the network path to the VN, and the message conforms to a Path Computational Element Protocol (PCEP).

Clause 32. The network element of Clause 31, wherein further comprising:

a receiver coupled to the processor, and configured to receive, before the processor associates the VN with available resources based on network constraints, a request from a customer controller to implement the VN.

Clause 33. The network element of Clause 31 or 32, wherein the network element is a Multi Domain Service Coordinator (MDSC) and the network controller is a Provider Network Controller (PNC)

Clause 34. The network element of any one of Clauses 31 to 33, wherein the message is a PCInitiate Message.

Clause 35. The network element of any one of Clause 31 to 34, wherein the network element is a Multi Domain Service Coordinator (MDSC) and the network controller is a Provider Network Controller (PNC).

Clause 35. The network element of any one of Clauses 31 to 34, wherein the network element is Parent Path Computational Element (P-PCE) and the network controller is a Child PCE.

Clause 36. The network element of any one of Clauses 31 to 35, wherein the network element is a Software Defined Network (SDN) controller.

Clause 37. The network element of any one of Clauses 31 to 36, wherein the association object is a Virtual Network Association Group (VNAG) object.

Clause 38. A network controller configured to establish end-to-end tunnels extending across multiple domains, comprising:

a receiver configure to receive a message from a network element that was instructed to implement a virtual network (VN) associated with the end-to-end tunnels, wherein the message includes an association object having a Type-Length-Value (TLV) field containing a virtual network identifier binding a network path used to form a portion of one of the end-to-end tunnels corresponding to the VN, and the message conforms to ta Path Computational Element Protocol (PCEP); and a processor coupled to the receiver, and configured to instruct a device managing the domain to establish the network path used to form the portion of one of the end-to-end tunnels.

Clause 39. The network controller of Clause 38, wherein The network element of claim 11, wherein the network element is a Multi Domain Service Coordinator (MDSC) and the network controller is a Provider Network Controller (PNC)

Clause 40. The network controller of Clause 38 or 39, wherein the message is a PCInitiate Message.

Clause 41. The network controller of any one of Clauses 38 to 40, wherein the network element is a Multi Domain Service Coordinator (MDSC) and the network controller is a Provider Network Controller (PNC).

Clause 42. The network controller of any one of Clauses 38 to 41, wherein the network element is Parent Path Computational Element (P-PCE) and the network controller is a Child PCE.

Clause 43. The network controller of any one of Clause 38 to 42, wherein the association object is a Virtual Network Association Group (VNAG) object.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of establishing an end-to-end tunnel extending across multiple domains using a network element, comprising:
    associating a virtual network (VN) with available resources based on network constraints, wherein the VN is associated with the end-to-end tunnel extending across the multiple domains; and
    transmitting a message to a network controller managing one domain of the multiple domains, wherein:
        the domain includes a network path forming a portion of the end-to-end tunnel, and
        the message includes an association object having a Type-Length-Value (TLV) field containing a virtual network identifier binding the network path to the VN, and
        the message conforms to a Path Computational Element Protocol (PCEP).

2. The method of claim 1, wherein before the associating the VN with available resources based on network constraints, further comprising:
    receiving a request from a customer controller to implement the VN.

3. The method of claim 1, wherein the virtual network identifier is one of a VN name and a tunnel identification (ID).

4. The method of claim 1, wherein the network constraints comprise at least one of quality of service (QoS) and bandwidth.

5. The method of claim 1, wherein the message is a PCInitiate message.

6. The method of claim 1, further comprising receiving, from the network controllers, a report message indicating a status of the network paths managed by the network controllers.

7. The method of claim 1, further comprising sending, to the network controllers, an update message which indicates any changes made to the VN by a customer controller.

8. A method of establishing an end-to-end tunnel extending across multiple domains implemented by a network controller managing a domain, comprising:
    receiving a message from a network element, wherein:
        the domain includes a network path forming a portion of the end-to-end tunnel,
        the message includes an association object having a Type-Length-Value (TLV) field containing a virtual network identifier binding the network path to an virtual network (VN), and
        the message conforms to to Path Computational Element Protocol (PCEP); and
    instructing a device managing the domain to establish the network path used to form the portion of the end-to-end tunnel.

9. The method of claim 8, further comprising receiving an indication from the device that the network path has been established.

10. The method of claim 8, further comprising receiving a second message from the network element, wherein the second message includes the association object having the TLV field containing the virtual network identifier binding a second network path used to form another portion of the end-to-end tunnels to the VN.

11. A network element configured to establish an end-to-end tunnel extending across multiple domains, comprising:
    a processor configured to associate a virtual network (VN) with available resources based on network constraints, wherein the VN is associated with the end-to-end tunnel; and
    a transmitter coupled to the processor and configured to transmit a message to a network controller managing one domain of the multiple domains, wherein:
        the domain includes a network path forming a portion of the end-to-end tunnel, and
        the message includes an association object having a Type-Length-Value (TLV) field containing a virtual network identifier binding the network path to the VN, and the message conforms to a Path Computational Element Protocol (PCEP).

12. The network element of claim 11, wherein further comprising:
    a receiver coupled to the processor, and configured to receive, before the processor associates the VN with available resources based on network constraints, a request from a customer controller to implement the VN.

13. The network element of claim 11, wherein the network element is a Multi Domain Service Coordinator (MDSC) and the network controller is a Provider Network Controller (PNC).

14. The network element of claim 11, wherein the message is a PCInitiate Message.

15. The network element of claim 11, wherein the network element is Parent Path Computational Element (P-PCE) and the network controller is a Child PCE.

16. The network element of claim 11, wherein the network element is a Software Defined Network (SDN) controller.

17. The network element of claim 11, wherein the association object is a Virtual Network Association Group (VNAG) object.

18. A network controller configured to establish an end-to-end tunnel extending across multiple domains, wherein the network controller manages one domain of the multiple domains, comprising:
    a receiver configure to receive a message from a network element,
    wherein:
        the domain includes a network path forming a portion of the end-to-end tunnel,
        the message includes an association object having a Type-Length-Value (TLV) field containing a virtual network identifier binding the network path to an virtul network (VN), and
        the message conforms to to Path Computational Element Protocol (PCEP); and
    a processor coupled to the receiver, and configured to instruct a device managing the domain to establish the network path forming the portion of the end-to-end tunnel.

19. The network controller of claim 18, wherein the network element is a Multi Domain Service Coordinator (MDSC) and the network controller is a Provider Network Controller (PNC).

20. The network controller of claim 18, wherein the message is a PCInitiate Message.

21. The network controller of claim 18, wherein the network element is Parent Path Computational Element (P-PCE) and the network controller is a Child PCE.

22. The network controller of claim 18, wherein the association object is a Virtual Network Association Group (VNAG) object.

* * * * *

UNITED STATES PATENT AND TRADEMARK OFFICE
CERTIFICATE OF CORRECTION

PATENT NO. : 10,812,340 B2  
APPLICATION NO. : 16/223879  
DATED : October 20, 2020  
INVENTOR(S) : Lee et al.

Page 1 of 2

It is certified that error appears in the above-identified patent and that said Letters Patent is hereby corrected as shown below:

On the Title Page

Item (56), in Column 2, under "Other Publications", Line 2, delete "{PCE}," and insert -- (PCE), --, therefor.

On Page 2, item (56), in Column 2, under "Other Publications", Line 11, delete "JP" and insert -- JP. --, therefor.

On Page 2, item (56), in Column 2, under "Other Publications", Line 32, delete "12 page." and insert -- 12 pages. --, therefor.

In the Specification

In Column 7, Line 45, delete "(3.0-3.B)" and insert -- (3.C-3.B) --, therefor.

In Column 13, Line 32, delete "to ta" and insert -- to a --, therefor.

In Column 14, Line 31, delete "to ta" and insert -- to a --, therefor.

In the Claims

In Column 15, in Claim 1, Line 21, delete "wherein:" and insert -- wherein --, therefor.

In Column 15, in Claim 5, Line 42, delete "PClnitiate" and insert -- PCInitiate --, therefor.

In Column 15, in Claim 6, Line 44, delete "controllers," and insert -- controller, --, therefor.

In Column 15, in Claim 6, Lines 45-46, delete "controllers." and insert -- controller. --, therefor.

In Column 15, in Claim 7, Line 48, delete "controllers," and insert -- controller, --, therefor.

Signed and Sealed this  
Twenty-fourth Day of January, 2023

Katherine Kelly Vidal  
*Director of the United States Patent and Trademark Office*

CERTIFICATE OF CORRECTION (continued)
U.S. Pat. No. 10,812,340 B2

In Column 15, in Claim 8, Line 53, delete "wherein:" and insert -- wherein --, therefor.

In Column 15, in Claim 8, Line 60, delete "to to" and insert -- to a --, therefor.

In Column 16, in Claim 11, Line 16, delete "wherein:" and insert -- wherein --, therefor.

In Column 16, in Claim 14, Line 36, delete "PClnitiate" and insert -- PCInitiate --, therefor.

In Column 16, in Claim 18, Line 51, delete the "." after -- wherein --.

In Column 16, in Claim 18, Line 57, delete "virtul" and insert -- virtual --, therefor.

In Column 16, in Claim 18, Line 58, delete "to to" and insert -- to a --, therefor.

In Column 17, in Claim 20, Line 2, delete "PClnitiate" and insert -- PCInitiate --, therefor.